(12) United States Patent
Onaka

(10) Patent No.: US 9,389,755 B2
(45) Date of Patent: Jul. 12, 2016

(54) INPUT APPARATUS, INPUT METHOD, AND INPUT PROGRAM

(71) Applicant: HONDA MOTOR CO., LTD., Tokyo (JP)

(72) Inventor: Junichiro Onaka, Utsunomiya (JP)

(73) Assignee: HONDA MOTOR CO., LTD., Tokyo (JP)

( * ) Notice: Subject to any disclaimer, the term of this patent is extended or adjusted under 35 U.S.C. 154(b) by 254 days.

(21) Appl. No.: 14/224,479

(22) Filed: Mar. 25, 2014

(65) Prior Publication Data

US 2014/0289631 A1 Sep. 25, 2014

(30) Foreign Application Priority Data

Mar. 25, 2013 (JP) ................................. 2013-061405

(51) Int. Cl.
| | |
|---|---|
| G06F 15/00 | (2006.01) |
| G06F 13/00 | (2006.01) |
| G06F 3/0482 | (2013.01) |
| G06F 3/0484 | (2013.01) |
| G06F 3/16 | (2006.01) |
| B60K 37/06 | (2006.01) |

(Continued)

(52) U.S. Cl.
CPC .............. *G06F 3/0482* (2013.01); *B60K 37/06* (2013.01); *G06F 3/0485* (2013.01); *G06F 3/0488* (2013.01); *G06F 3/04842* (2013.01); *G06F 3/167* (2013.01)

(58) Field of Classification Search
CPC ... G06F 3/0236; G01C 21/3688; G06Q 50/24

USPC .......................... 715/741–745, 727, 825, 700
See application file for complete search history.

(56) References Cited

U.S. PATENT DOCUMENTS

| | | | |
|---|---|---|---|
| 5,059,965 A | * | 10/1991 | Geiser .................. G06F 3/0236 340/4.13 |
| 6,956,470 B1 | | 10/2005 | Heise et al. |

(Continued)

FOREIGN PATENT DOCUMENTS

| | | |
|---|---|---|
| CN | 1364704 | 8/2002 |
| CN | 1372516 | 10/2002 |

(Continued)

OTHER PUBLICATIONS

Chinese Office Action dated Sep. 29, 2015 with partial English translation of Search Report, 10 pages.

(Continued)

*Primary Examiner* — Kevin Nguyen
(74) *Attorney, Agent, or Firm* — Rankin, Hill & Clark LLP

(57) ABSTRACT

An operation input unit detects an operation position corresponding to an operation input; a display processing unit changes a display item to be displayed on a display unit of a plurality of items, depending on a change of the operation position; a processing control unit continues a process of changing the display item to be displayed on the display unit until a predetermined input is received, while a vehicle is moving, and when an operation speed of moving the operation position is higher than a preset threshold of the operation speed, or an operation acceleration at which the operation speed changes is higher than a preset threshold of the operation acceleration; and an item selecting unit selects any of the plurality of items based on the predetermined input.

11 Claims, 8 Drawing Sheets

(51) Int. Cl.
*G06F 3/0488* (2013.01)
*G06F 3/0485* (2013.01)

(56) References Cited

U.S. PATENT DOCUMENTS

| | | | | |
|---|---|---|---|---|
| 2008/0300731 | A1* | 12/2008 | Nakajima | B60W 50/045 701/1 |
| 2011/0130916 | A1* | 6/2011 | Mayer | G07C 5/008 701/31.4 |
| 2011/0130959 | A1* | 6/2011 | Hwang | G01C 21/3614 701/533 |
| 2012/0139935 | A1* | 6/2012 | Miyasaka | G06F 3/0488 345/589 |
| 2012/0191476 | A1* | 7/2012 | Reid | G06Q 50/24 705/3 |
| 2012/0329520 | A1* | 12/2012 | Akama | G01C 21/3688 455/557 |

FOREIGN PATENT DOCUMENTS

| | | |
|---|---|---|
| DE | 3712360 | 10/1988 |
| JP | 2010-020696 | 1/2010 |
| JP | 2010-073205 | 4/2010 |
| JP | 2010-185686 | 8/2010 |
| JP | 2010-262400 | 11/2010 |
| JP | 2011-086210 | 4/2011 |
| JP | 2012-093802 | 5/2012 |

OTHER PUBLICATIONS

Japanese Office Action with English Translation dated Mar. 24, 2015, 6 pages.
European Search Report dated Jun. 17, 2015, 6 pages.

* cited by examiner

INPUT APPARATUS, INPUT METHOD, AND INPUT PROGRAM

CROSS-REFERENCE TO RELATED APPLICATION

Priority is claimed on Japanese Patent Application No. 2013-061405, filed Mar. 25, 2013, the content of which is incorporated herein by reference.

BACKGROUND

1. Field of the Invention

The present invention relates to an input apparatus, an input method, and an input program.

2. Description of the Related Art

Conventionally, an electronic device that reproduces contents such as music and speech in a vehicle has been developed. The electronic device can be installed in front of a driver's seat so that the driver can select a desired content. At the time of selecting the content, a list including items indicating identification information such as the title and the number of respective contents is displayed, and the driver selects any item included in the displayed list. When there is a plurality of selectable contents, all the items indicating these contents may not be included in a one-frame image. Therefore, according to a document processing method described in Patent Document 2010-73205, the items are changed over for each predetermined display period.

SUMMARY

However, in the conventional electronic device, because the items displayed in the list are changed over, the driver must keep a close watch on a screen displaying the list in order to select a desired content. Hence, the electronic device may impose a limitation such that the list display is stopped during driving or the content is not changed even when the list is displayed (display only one frame). In this case, the driver cannot select an item indicating a desired content.

Aspects of the present invention are aimed at providing an input apparatus, an input method, and an input program that can select an item easily during driving.

(1) An input apparatus of an aspect according to the present invention includes: an operation input unit that detects an operation position corresponding to an operation input; a display processing unit that changes a display item to be displayed on a display unit of a plurality of items, depending on a change of the operation position; a processing control unit that continues a process of changing the display item to be displayed on the display unit until a predetermined input is received, while a vehicle is moving, and when an operation speed of moving the operation position is higher than a preset threshold of the operation speed, or an operation acceleration at which the operation speed changes is higher than a preset threshold of the operation acceleration; and an item selecting unit that selects any of the plurality of items based on the predetermined input.

(2) In an aspect of (1) above, the processing control unit may set a higher change speed for changing the display items as a running speed of the vehicle increases.

(3) In an aspect of either one of (1) and (2) above, there may be provided a speech synthesizing unit that synthesizes speech corresponding to a text indicated by any of the display items at a rate of utterance corresponding to the change speed for changing the display items.

(4) In an aspect of any one of (1) through (3) above, there may be provided a speech recognizing unit that recognizes an utterance content of recorded speech, and the processing control unit may cause the speech recognizing unit to start a process of recognizing at least any of the display items as the utterance content of the recorded speech, when the operation speed is higher than the threshold of the operation speed, or when the operation acceleration at which the operation speed changes is higher than the preset threshold of the operation acceleration.

(5) In an aspect of any one of (1) through (3) above, the plurality of items may be classified into one or a plurality of large items, and the processing control unit may cause the display unit to display the large item corresponding to the display item, when the change speed for changing the display items exceeds a preset threshold of change speed.

(6) In an aspect of (5) above, the processing control unit may cause the display unit to display each of the large items for a certain predetermined time.

(7) In an aspect of (4) above, the plurality of items may be classified into one or a plurality of large items, and the processing control unit may cause the display unit to display the large item corresponding to the display item, when the change speed for changing the display items exceeds a preset threshold of change speed.

(8) In an aspect of (7) above, the processing control unit may cause the display unit to display each of the large items for a certain predetermined time.

(9) In an aspect of either one of (7) and (8) above, the processing control unit may cause the speech recognizing unit to recognize a large item corresponding to any of the display items as the utterance content of the recorded speech.

(10) In an aspect of any one of (1) through (9) above, the item selecting unit may select a display item displayed in the past by a predetermined time, from the item selected by the item selecting unit, of the plurality of items.

(11) In an input method of an aspect according to the present invention, an input method for an input apparatus, includes: a display processing step of changing a display item to be displayed on a display unit of a plurality of items, depending on a change of an operation position detected by an operation input unit corresponding to an operation input; a processing control step of continuing a process of changing the display item to be displayed by the display unit until a predetermined input is received, while a vehicle is moving, and when an operation speed of moving the operation position is higher than a preset threshold of the operation speed, or an operation acceleration at which the operation speed changes is higher than a preset threshold of the operation acceleration; and an item selecting step of selecting any of the plurality of items based on the predetermined input.

(12) An input program of an aspect according to the present invention, causes a computer of an input apparatus to execute: a display processing procedure of changing a display item to be displayed on a display unit of a plurality of items, depending on a change of an operation position detected by an operation input unit corresponding to an operation input; a processing control procedure of continuing a process of changing the display item to be displayed by the display unit until a predetermined input is received, while a vehicle is moving, and when an operation speed of moving the operation position is higher than a preset threshold of the operation speed, or an operation acceleration at which the operation speed changes is higher than a preset threshold of the operation acceleration; and an item selecting procedure of selecting any of the plurality of items based on the predetermined input.

According to the aspects of (1), (11), and (12) above, when the operation speed becomes higher than the predetermined threshold of the operation speed while the vehicle is moving, or when the operation acceleration becomes higher than the preset threshold of the operation acceleration, the change of display items to be displayed on the display unit is continued until a predetermined input is received. Therefore items can be selected easily without a situation where a user keeps a close watch on the display unit during driving.

In the case of (2) above, because the display items are changed at a higher speed as the running speed of the vehicle increases, a situation where the user keeps a close watch on the display unit can be prevented.

In the case of (3) above, because speech indicating the display item is presented, the user can ascertain a selectable item without visually checking the display unit.

In the case of (4) above, when the operation speed becomes higher than the preset threshold, any of the display items can be recognized from the utterance of the user. Accordingly, the item can be selected easily without performing the operation input manually.

In the case of (5) and (7) above, when the change speed for changing the display item becomes higher than the preset threshold, the large item corresponding to the display item is displayed on the display unit. Because the displayed large item is changed over at a lower frequency than that of the display item, the user can have a clue for selecting the item without keeping a close watch on the display unit.

In the case of (6) and (8) above, the large item is displayed for the certain predetermined time on the display unit, regardless of the number of display items corresponding thereto. Accordingly, the user can ascertain the contents of the large items regarding usable items in priority to other items.

In the case of (9) above, by recognizing the large item corresponding to the display item based on the utterance of the user, the large item can be selected. Accordingly, the user can select a desired item, starting from any item corresponding to the selected large item, without performing an operation input manually.

In the case of (10) above, by selecting a display item displayed in the past by the predetermined time, from the selected item, the time until the user recognizes the display item and a delay time involved with the process can be compensated. Therefore, even if the display items change sequentially, the user can easily select a desired display item.

DESCRIPTION OF EMBODIMENTS

First Embodiment

Hereinafter, a first embodiment of the present invention will be described with reference to the accompanying drawings.

An input apparatus 10 according to the present embodiment constitutes for example a part of on-vehicle equipment 1 to be installed in a vehicle.

Figure 1:
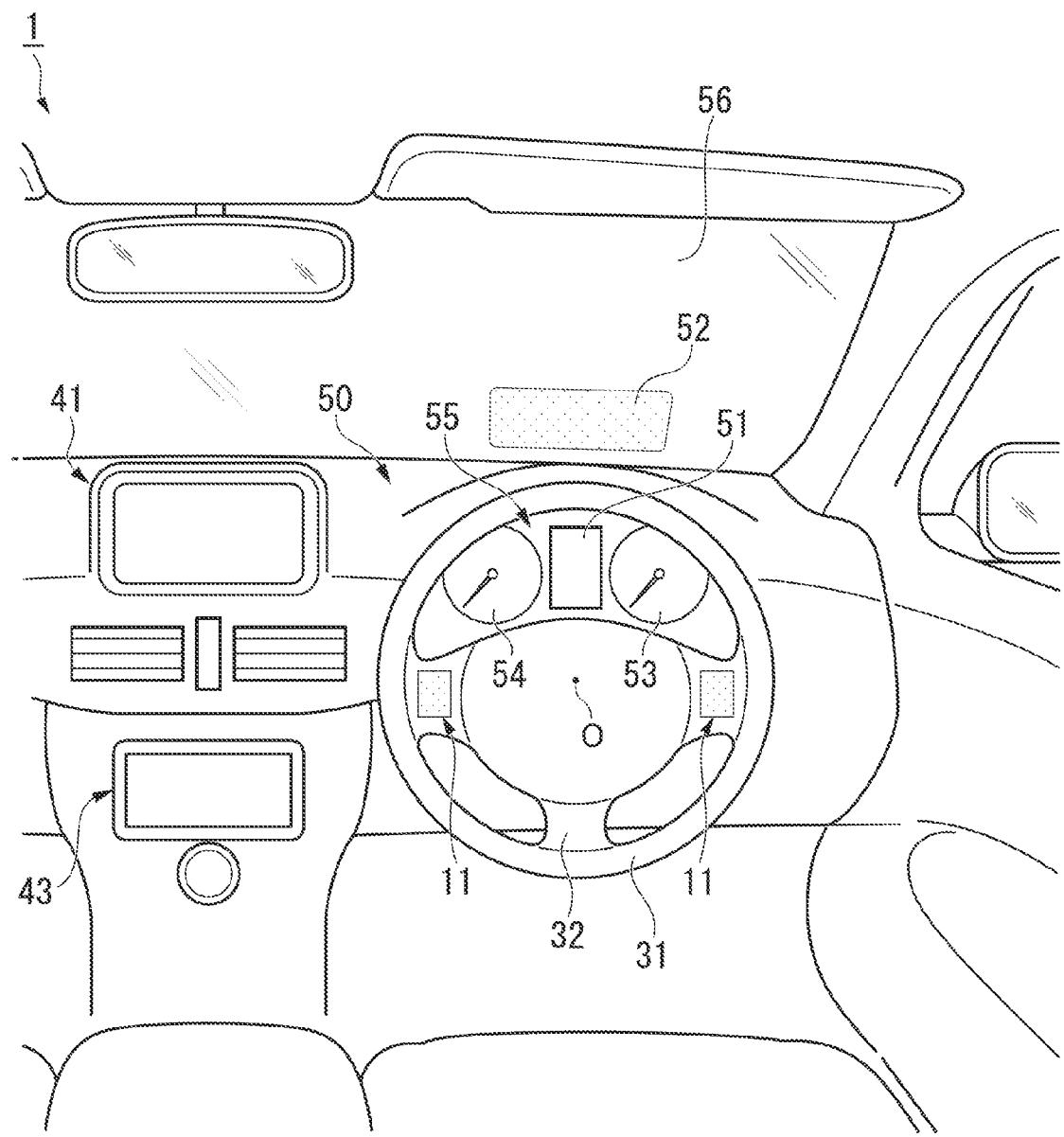
FIG. 1 is a diagram showing an outline example of on-vehicle equipment according to a first embodiment of the present invention.

FIG. 1 is a diagram showing an outline example of the on-vehicle equipment 1 according to the present embodiment.

The on-vehicle equipment 1 includes, for example, touch sensors 11, a navigation device 41, an acoustic device 43, an MID (Multiple Information Display) device 51, and an HUD (Head Up Display) device 52.

The touch sensors 11 are arranged in a wheel part 32 of a steering wheel 31, respectively on the left side and the right side of a rotation axis O in a state with the steering wheel 31 not being steered. The touch sensors 11 detect a contact area touched by an operating object, for example, a user's finger operated by the user (for example, a driver). One touch sensor 11 may be arranged at either of the left side or the right side of the rotation axis O.

The navigation device 41 is arranged for example on an upper stage of a front left side of a driver's seat. The navigation device 41 includes an image display unit that displays by an image, a position where the vehicle is moving and a route to a destination. In the navigation device 41, for example, any of a plurality of destinations can be selected based on an operation input of the user.

The acoustic device 43 is arranged for example on a lower stage of the front left side of the driver's seat. The acoustic device 43 reproduces sound according to a desired sound content of a plurality of sound contents such as music, soundtrack, and broadcast programs. The acoustic device 43 includes an image display unit that displays items such as a title of the sound content being played, a broadcasting frequency, and the type of a sound source. In the acoustic device 43, for example, any item of the sound contents can be selected based on an operation input of the user.

The image display unit (for example, a liquid crystal display) included in the navigation device 41 and the acoustic device 43 can be integrated with an operation input unit (for example, a touch sensor) to form a touch panel.

Figure 2:
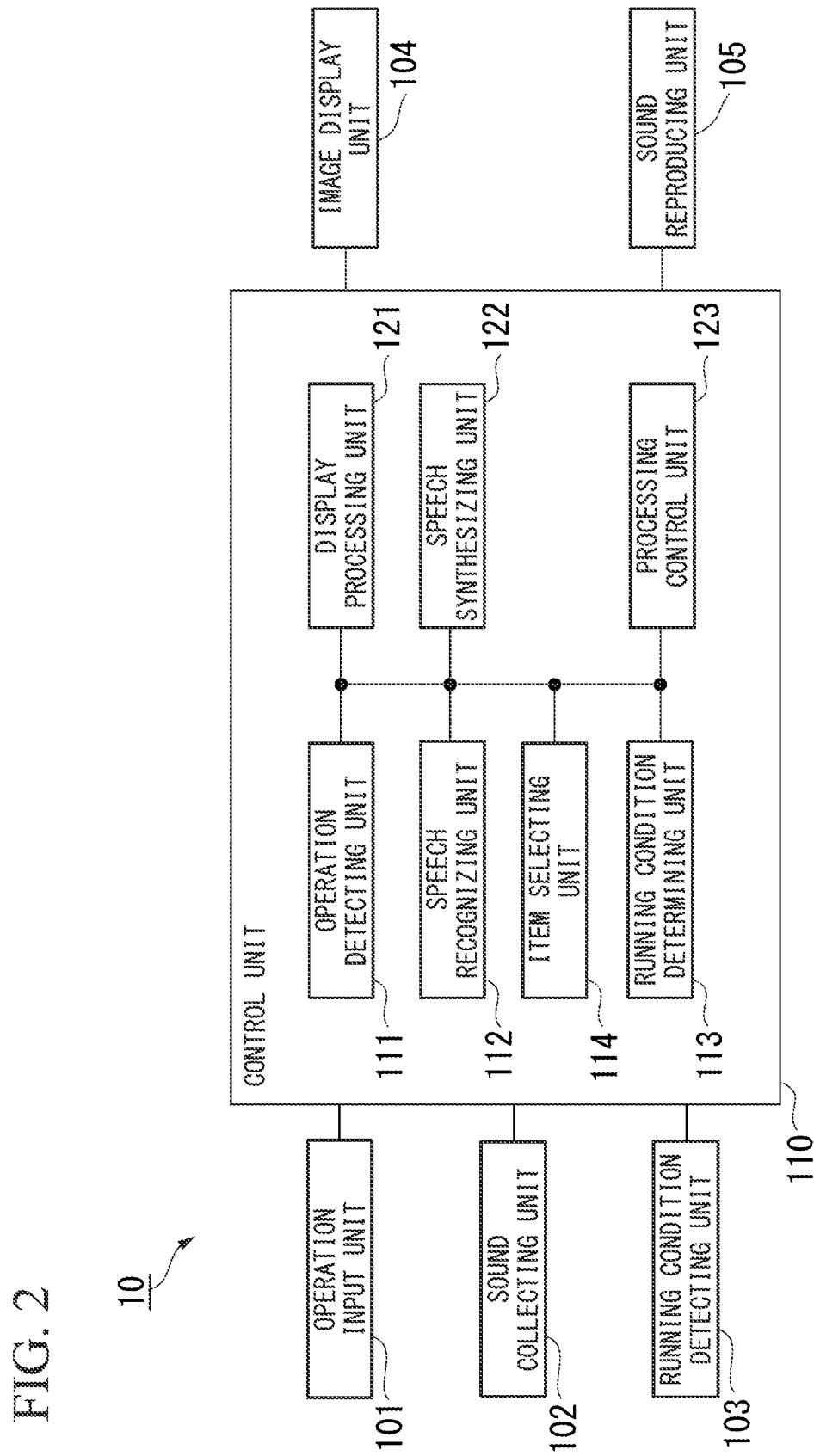
FIG. 2 is a schematic block diagram showing a configuration of an input apparatus according to the present embodiment.

The MID device 51 includes for example an image display unit arranged in the middle of a meter panel 55 that includes meters such as a speedometer 53 and a rev counter 54 provided in an instrument panel 50 on the front of the driver's seat. For example, the MID device 51 displays various pieces of vehicle information such as running distance of the vehicle, temperature inside and outside the vehicle, and fuel consumption based on a running condition detection signal indicating the running condition detected by a running condition detecting unit 103 (FIG. 2). The MID device 51 can display, for example, a destination used by the navigation device 41, or items of the sound contents used by the acoustic device 43.

The HUD device 52 for example projects and displays an image on a part of a front glass 56 on the front of the driver's seat. The HUD device 52 may display a virtual image above the instrument panel 50. The image displayed by the HUD device 52 is, for example, an image indicating various pieces of vehicle information, an image indicating a position where the vehicle is moving and a route to the destination, an image indicating the destination, and an image indicating items of the sound contents.

The configuration of the input apparatus 10 will be described next.

FIG. 2 is a schematic block diagram showing the configuration of the input apparatus 10 according to the present embodiment.

The input apparatus 10 includes for example, an operation input unit 101, a sound collecting unit 102, the running condition detecting unit 103, an image display unit 104 (display unit), a sound reproducing unit 105, and a control unit 110.

The operation input unit 101 detects a contact area touched by the operating object operated by the user, as an operation input, and outputs a contact signal indicating the detected contact area to the control unit 110. The operation input unit 101 is, for example, a touch sensor (FIG. 1). When the navigation device 41 and the acoustic device 43 (FIG. 1) includes a touch panel, the operation input unit 101 may be, for example, an operation input unit that constitutes the touch panel.

The operation input unit 101 is not limited to one that can detect, for example, a position touched by a contact object or a force direction thereof, such as the touch sensor 11 (FIG. 1) or the touch panel. Moreover, a detection method used by the operation input unit 101 may be any of a capacitance method, a resistance film method, and the like. For the operation input unit 101, any of the methods can be used so long as it enables detection of the direction instructed by the user's operation, or it enables instruction of a rotation direction to at least one direction. The operation input unit 101 may be any of, for example; a pressure sensor, a magnetic force sensor, a switch constituted by a plurality of electrostatic sensors, a track pad, or a rotary switch, or may be an arbitrary combination of these.

The sound collecting unit 102 is an electro-acoustic transducer that converts incoming sound waves to a sound signal being an electric signal, and thereby records the sound, and is for example a microphone. The sound collecting unit 102 outputs the converted sound signal to the control unit 110.

The running condition detecting unit 103 detects a physical amount indicating the running condition of the vehicle, and outputs a running condition detection signal indicating the detected physical amount to the control unit 110. The running condition detecting unit 103 is configured to include a vehicle speed sensor that detects, for example, the running speed of the vehicle as the physical amount, and outputs a vehicle speed signal indicating the detected running speed.

The image display unit 104 displays an image based on the image signal input from the control unit 110.

The image display unit 104 is, for example, an image display unit included in the navigation device 41 (FIG. 1), an image display unit included in the acoustic device 43 (FIG. 1), an image display unit included in the MID device 51 (FIG. 1), the HUD device 52 (FIG. 1), or the like.

The sound reproducing unit 105 may include a sound source that reproduces sound based on the sound signal input from the control unit 110, and is for example a speaker. For example, the sound reproducing unit 105 may be used to reproduce the sound based on the sound signal related to the sound content input from the acoustic device 43 (FIG. 1).

The control unit 110 includes; an operation detecting unit 111, a speech recognizing unit 112, a running condition determining unit 113, an item selecting unit 114, a display processing unit 121, a speech synthesizing unit 122, and a processing control unit 123.

The operation detecting unit 111 determines the contact area indicated by the contact signal input from the operation input unit 101, and calculates a central point of each of the determined contact areas as a contact position where the operating object has touched an operation surface of the operation input unit. This is because the contact area has a certain size, and a plurality of contact areas may be present. In the determination of the contact area, the operation detecting unit 111 determines that spatially continuous contact areas belong to one contact area. The operation detecting unit 111 generates a contact operation signal indicating the contact area and the contact position.

Coordinate correspondence information may be preset in the operation detecting unit 111. The coordinate correspondence information indicates a correspondence relation between; a coordinate system (contact coordinate system) indicating a contact position in a contact detection area in which the operation input unit 101 detects contact with the operating object, and a coordinate system (display coordinate system) indicating a display position in an image display area in which the image display unit 104 displays an image. Accordingly, the contact position indicated by the contact operation signal indicates the display position associated based on the coordinate correspondence information.

The operation detecting unit 111 determines or calculates; a presence of the contact area, a pressing force, a moving direction of the contact area (contact position), a moving amount, a moving speed (operation speed), a moving acceleration (operation acceleration), and the like, within a predetermined time interval based on the input contact signal. This determined or calculated information may be included in the contact operation signal.

The operation detecting unit 111 divides, for example, the moving amount from the contact position detected immediately before to the contact position currently detected, by a detection time interval to calculate the current moving speed. The moving speed is an index indicating the operation speed related to the operation input, and may be referred to as contact speed in an example described below.

The operation detecting unit 111 divides, for example, a change amount of the speed from the moving speed calculated immediately before to the moving speed currently calculated, by the detection time interval to calculate the current moving acceleration. The moving acceleration is an index indicating the operation acceleration related to the operation input, and may be referred to as contact acceleration in the example described below.

Moreover, the operation detecting unit 111 determines the type of operation based on the determined or calculated information. This information indicating the determined type may be included in the contact operation signal.

The type of operation includes, for example, a flick operation and a click operation.

The flick operation is an operation to move the contact area while bringing the operating object into contact with the surface of the operation input unit 101 for a relatively short time. For example, the operation detecting unit 111 determines the performed operation as the flick operation, when the contact area is continuously detected for a preset period (for example, 0.3 to 1 second) and a change of the contact position from contact start to contact end in the period is larger than a preset distance.

The click operation is an operation to bring the operating object into contact with the surface of the operation input unit 101 for a relatively short time without moving the operating object. The operation detecting unit 111 determines the performed operation as the click operation, when the period in which the contact area is continuously detected is shorter than a preset time (for example, 0.3 seconds) and the change of the contact position from contact start to contact end is smaller than the preset distance. Moreover, when a plurality of click operations is determined within the preset time (for example, 1 second), the operation detecting unit 111 may determine a set of click operations as one continuous operation (double-click operation).

The operation detecting unit 111 outputs the generated contact operation signal to the item selecting unit 114, the display processing unit 121, and the processing control unit 123.

The speech recognizing unit 112 performs well-known speech recognition, and recognizes the utterance content related to the sound signal input from the sound collecting unit 102. The speech recognizing unit 112 stores beforehand, a word dictionary including a plurality of items indicated by item data described later, respectively, as words, as an acoustic model, for example, as a hidden Markov model (HMM), and as a language model. The word dictionary is data indicating a correspondence relation between a phoneme sequence and a word.

The speech recognizing unit 112 calculates an acoustic feature amount of the input sound signal for each predetermined time, and sets a phoneme by using the acoustic model based on the calculated acoustic feature amount. The speech recognizing unit 112 recognizes any of the words indicated in the word dictionary from the phoneme sequence including the set phonemes. When recognizing any of the items as the recognized word, the speech recognizing unit 112 outputs recognition item data indicating the recognized item to the item selecting unit 114. The item will be described later in the explanation of the display processing unit 121.

When for example, a processing mode indicated by the processing mode signal input from the processing control unit 123 is changed to a continuous change mode, the speech recognizing unit 112 may start the speech recognition processing for recognizing the utterance content of the speech. Moreover, when the processing mode indicated by the processing mode signal input from the processing control unit 123 is changed to a normal mode, the speech recognizing unit 112 may stop the speech recognition processing. The processing mode signal, the continuous change mode, and the normal mode will be described later in the explanation of the processing control unit 123.

Moreover, the speech recognizing unit 112 may generate a synthesis control signal for controlling processing performed by the speech synthesizing unit 122 based on the utterance content of the recognized sound signal, and output the generated synthesis control signal to the display processing unit 121. The control indicated by the synthesis control signal includes, for example, to repeat the synthesizing and outputting process of the sound signal (repeat), to change a representative display item (described later) of the sound signal to be synthesized to the next display item (next candidate selection), to change the representative display item (described later) of the sound signal to be synthesized to the previous display item (previous candidate selection), and the like. Consequently, the word indicating the respective controls and the phoneme sequence indicating pronunciation thereof are associated with each other and stored beforehand in the word dictionary. The word indicating the control includes, for example, "again" indicating repeat, "next" indicating the next candidate selection, "return" indicating the previous candidate selection, and the like.

The running condition determining unit 113 determines, for example, the running condition of the vehicle based on the running condition detection signal input from the running condition detecting unit 103. For example, when the running speed indicated by the running condition detection signal is equal to a preset threshold of the speed (for example, 0 kilometer per hour), the running condition determining unit 113 determines that the vehicle is being stopped. When the speed indicated by the running condition detection signal is higher than the preset threshold of the speed, the running condition determining unit 113 determines that the vehicle is moving. The running condition determining unit 113 outputs a running condition signal indicating the determined running condition, to the processing control unit 123.

In the present embodiment, the threshold of the speed can be a low speed (for example, 4 kilometers per hour) sufficiently close to 0 kilometer per hour. In this case, for example, when the speed indicated by the speed signal in forward driving is equal to or lower than the threshold (for example, 0 kilometers per hour) of the preset speed, the running condition determining unit 113 determines that the vehicle is being stopped. Moreover, for example, when the speed indicated by the speed signal in forward driving is higher than the threshold of the speed, the running condition determining unit 113 determines that the vehicle is moving. As a result, when attentiveness required for driving is relatively low, such as when the vehicle is moving at a sufficiently low speed, it can be regarded that the vehicle is being stopped.

The item selecting unit 114 selects any of the display items displayed on the image display unit 104, based on the contact operation signal input from the operation detecting unit 111. For example, the item selecting unit 114 selects an item in which the position of the image display unit 104 corresponding to the contact position indicated by the contact operation signal is included in the displayed area. That is, the item displayed at the position instructed by the operation input is selected.

Moreover, when the recognition item data is input from the speech recognizing unit 112, the item selecting unit 114 may select an item indicated by the input recognition item data.

The item selecting unit 114 generates selection item information indicating the selected item and outputs the generated selection item information to either of the display processing unit 121, and a device (for example, the navigation device 41 and the acoustic device 43) and a component that uses the selected item.

When the display item to be displayed on the image display unit 104 has been changed, the item selecting unit 114 may select the display item displayed at a time going back to the past by a preset standby time, rather than the position on the image display unit 104 corresponding to the contact position indicated by the contact operation signal. For example, the standby time may be set so that the standby time becomes equal to a delay time, which is the sum of a response time (for example, 0.7 seconds) and processing time (for example, 0.3 seconds). The response time is a time since the user visually checks the item displayed on the image display unit 104 until the operating object touches the operation input unit 101 by the operation input. The processing time is a time spent for selecting any of the display items after the operating object has touched the operation input unit 101.

The item selecting unit 114 may select from the display item having the display area including the position corresponding to the currently detected contact position, the display item having a display area including the position corresponding to the contact position detected at a time going back to the past by the preset standby time.

The item selecting unit 114 calculates as the contact position detected at the time going back to the past, for example, a position at which the contact position indicated by the contact operation signal input from the operation detecting unit 111 is moved in an opposite direction to the moving direction by the moving amount indicated by a product of the moving speed and the standby time. Moreover, the item selecting unit 114 may store the current contact position, and the display item having the display area including the position corresponding to the contact position, in association with each other, from the present until at least the standby time has passed.

By continuing this process, the contact position from the present until at least the standby time has gone back, and the display item having the display area including the contact position, are stored in association with each other.

As a result, the influence of the movement of the display item due to the response time and the processing time is compensated, and the user can select a desired item.

When selecting an item having a display area in which the position of the image display unit 104 corresponding to the contact position indicated by the contact operation signal is included in the displayed area, the item selecting unit 114 may only use a parallel component (coordinate value) to an arrangement direction (for example, a vertical direction) of the respective items at the contact position (this may be the compensated contact position). As a result, the processing amount at the time of selecting the item is decreased.

Moreover, the item selecting unit 114 may change the candidate item, which is a candidate to be selected, based on the contact operation signal input from the operation detecting unit 111, or may determine the candidate item as a selected item. For example, every time a contact operation signal indicating the click operation is input, the item selecting unit 114 may change the candidate item to an item adjacent to the preset arrangement direction. When the contact operation signal indicating the double-click operation is input, the item selecting unit 114 may determine the candidate item currently set as the selected item.

The display processing unit 121 causes the image display unit 104 to display the preset number of items (for example, five) of the plurality of items indicated by the item data. The number of items (number of display items) to be displayed on the image display unit 104 (display items) may be set beforehand according to the size of a display frame on the image display unit 104, or the size of characters.

The item data is information indicating a plurality of items. The item data is, for example, destination data in which a plurality of destinations to be used by the navigation device 41 (FIG. 1) is shown as items, or sound content identification data in which identification information such as the title and the number of the respective sound contents to be used by the acoustic device 43 (FIG. 1) is shown as items. That is, the item is a character string used as an index.

The item data may be stored beforehand in the display processing unit 121, or the display processing unit 121 may read the item data at the time of startup of the device (for example, the navigation device 41 or the acoustic device 43) that holds the item data, or of the other components, or at the time of starting the operation.

The display processing unit 121 may store the respective items indicated by the read item data in association with the phoneme sequence indicating the pronunciation thereof, in the word dictionary of the speech recognizing unit 112. As a result, the speech recognizing unit 112 can recognize any of the plurality of items indicated by the item data.

For example, the display processing unit 121 may preset initial display items to be displayed initially, as items from a first item to an item numbered of display items of the items indicated by the item data.

The display processing unit 121 sets an item to be displayed by the image display unit 104 based on the contact operation signal input from the operation detecting unit 111. For example, when the contact operation signal indicates the flick operation, the display processing unit 121 may cause the image display unit 104 to scroll display an item image indicating the display item. Scroll display means to display an image that cannot fit into the display frame within a range of a display frame, by changing the display position of the image, according to the operation input (for example, change of the contact position by the flick operation).

The display processing unit 121 includes, for example, an area of the display frame to display the item image. It arranges the character string indicating the respective items in a predetermined direction and a predetermined order, and with a predetermined gap in an image generation area having an area larger than the area thereof, to generate an item arrangement image.

The predetermined order is, for example, an order of characters included in the character string that forms the respective items. For example, the order of characters is an alphabetical order when the character string forming the item includes alphabets, or the order of characters is an order of Japanese alphabetical order when the character string includes kana characters that describe syllables in Japanese, and the order of characters is an ascending order when the character string includes numeric characters. In the item data, the respective items can be associated with the predetermined order. Moreover, the display processing unit 121 matches the position at the top of the item, with the order thereof being the head, with the position at the end of the item, with the order thereof being the tail end, and generates the item arrangement image arranged such that a plurality of items indicated by the item data is circulated.

The display processing unit 121 extracts from the generated item arrangement image, an image included in a range of the display frame as an item image, and outputs an item image signal indicating the extracted item image to the image display unit 104.

During this period, when the contact operation signal indicating the flick operation is input, the display processing unit 121 moves the position of the generated item arrangement image, for example, at a contact speed indicated by the contact operation signal input from the operation detecting unit 111, for a preset migration time (for example, 1 second) starting from the end of contact. As a result, when the processing mode described later is the normal mode, the change of display items to be displayed on the image display unit 104 is stopped, after the preset migration time has passed.

The direction to move the position of the item arrangement image may be limited to the same direction as the direction of arranging the character string indicating the respective items in the image generation area, or to the opposite direction thereto. As a result, the display item to be displayed on the image display unit 104 is changed according to the change of the contact position. Moreover, the change speed of the display item increases with an increase of the speed of the contact position (contact speed).

For example, the display processing unit 121 may set the change speed of the display item based on the running speed indicated by the running condition detection signal input from the running condition detecting unit 103. The display processing unit 121 may set the change speed so that the change speed increases with an increase of the running speed. In the change speed, a lower limit, an upper limit, or the both may be preset.

Moreover, the display processing unit 121 sets the change speed of the display item corresponding to the moving speed for moving the position of the item arrangement image, and outputs the change speed signal indicating the set change speed to the speech synthesizing unit 122. At the time of setting the change speed of the display item, the display processing unit 121 may set the moving speed based on the vehicle speed information, or may set the moving speed without referring to the vehicle speed information.

When the processing mode indicated by the processing mode signal input from the processing control unit 123 is changed to the continuous change mode, and the contact operation signal indicating the flick operation is input from the operation detecting unit 111, the display processing unit 121 continues to move the position of the generated item arrangement image without stopping the movement.

As a result, the display items displayed on the image display unit 104 are continuously changed and repeated, designating the sum total of the items indicated by the item data as one cycle (the continuous change mode is ON, and the normal display mode is OFF). This is because, since as described above, the plurality of items is circulated and arranged in the item arrangement image, the display items are displayed as if the display items are being rotated.

However, when the predetermined input is detected in the continuous change mode, the display processing unit 121 stops movement of the item arrangement image, thereby stopping the change of display items. The predetermined input is, for example; the contact operation signal to be used when the item selecting unit 114 selects the display item, the recognition item data, and the synthesis control signal to control the processing performed by the speech synthesizing unit 122.

The contact operation signal is input from the operation detecting unit 111, and the recognition item data is input from the speech recognizing unit 112, whereas the synthesis control signal is input from the speech recognizing unit 112, as described later. As a result, when the operation to select the item desired by the user is being performed, the change of display items is stopped. Because the user can easily confirm the item the user intends to select or the selected item, the operability is improved.

When the processing mode indicated by the input processing mode signal is changed to the normal mode, and the contact operation signal indicating the flick operation is input, the display processing unit 121 stops changing of display items to be displayed on the image display unit 104 after the preset migration time has passed (the continuous change mode is OFF, and the normal display mode is ON).

When the processing mode indicated by the processing mode signal input from the processing control unit 123 is changed to the continuous change mode, the display processing unit 121 may stop output of the item image signal to the image display unit 104, to stop display of the item image on the image display unit 104 (display OFF). In the image display unit 104, even when the display of the item image is stopped, the display processing unit 121 stores beforehand item display area information indicating a position relation between the image display area in which the image display unit 104 displays an image, and the range of the display frame described above. Even when the display of the item image on the image display unit 104 is stopped, the display processing unit 121 can specify the display item to be displayed on the image display unit 104. As described later, the speech synthesizing unit 122 synthesizes the sound signal related to speech indicating the display item to be displayed, and the speech is reproduced by the sound reproducing unit 105. Consequently, the user can ascertain the display item by the reproduced speech.

Moreover, when the processing mode indicated by the processing mode signal input from the processing control unit 123 is changed to the normal mode, the display processing unit 121 may restart output of the item image signal to the image display unit 104, to restart display of the item image on the image display unit 104 (display ON).

Furthermore, when the selection item information is input from the item selecting unit 114, that is, when any item is selected, the display processing unit 121 may stop movement of the item arrangement image.

The display processing unit 121 designates any of the display items as a display item to be a representative (representative display item), and outputs representative display item information indicating the set representative display item to the speech synthesizing unit 122. When the number of display items is plural, the display processing unit 121 sets a display item to be displayed at a preset position, for example, in the middle of the display frame, as the representative display item. When the number of display items is one, the display processing unit 121 sets the one display item as the representative display item.

The display processing unit 121 may control the processing performed by the speech synthesizing unit 122 based on the synthesis control signal input from the speech recognizing unit 112. Here, the display processing unit 121 selects the representative display item depending on the type of the control indicated by the input synthesis control signal. For example, when the synthesis control signal indicates repetition, the display processing unit 121 outputs the representative display item information indicating the representative display item set immediately before, to the speech synthesizing unit 122. As a result, the speech synthesizing unit 122 again synthesizes the sound signal related to the speech indicating the representative display item, and the speech is reproduced by the sound reproducing unit 105. For example, when the synthesis control signal indicates selection of the next candidate, the display processing unit 121 selects the item in the next order of the representative display item set immediately before, as the representative display item, and outputs the representative display item information indicating the selected representative display item, to the speech synthesizing unit 122.

As a result, the speech synthesizing unit 122 synthesizes the sound signal related to the speech indicating the newly selected item in the next order, and the speech is reproduced by the sound reproducing unit 105. For example, when the synthesis control signal indicates selection of the previous candidate, the display processing unit 121 selects an item in the previous order of the representative display item set immediately before, as the representative display item, and outputs the representative display item information indicating the selected representative display item, to the speech synthesizing unit 122. As a result, the speech synthesizing unit 122 synthesizes the sound signal related to the speech indicating the newly selected item in the previous order, and the speech is reproduced by the sound reproducing unit 105. Accordingly, the user can search for the desired item by utterance.

In the present embodiment, when the image display unit 104 includes a plurality of image display units that display an image, the display processing unit 121 may output the item image signal to at least one of the image display units, to cause the image display unit to display the item image. The image display unit at the output destination may be an arbitrary combination of the plurality of image display units. In this case, the number of display items to be displayed for each of the image display units, or the size of an input frame, may be different from each other or may be the same.

The speech synthesizing unit 122 performs well-known text speech synthesis (text read processing) to synthesize a sound signal of the speech having pronunciation indicated by the text information. The speech synthesizing unit 122 synthesizes the sound signal of the speech indicating the representative display item indicated by the representative display item information input from the display processing unit 121. The speech synthesizing unit 122 outputs the synthesized sound signal to the sound reproducing unit 105. Before the synthesis of the sound signal currently being performed is complete, other representative display item information may be input newly to the speech synthesizing unit 122. In this case, after the synthesis of the sound signal currently being performed is complete, the speech synthesizing unit 122 starts the processing to synthesize the sound signal of the speech indicated by the newly input representative display item information. As a result, the speech indicating any of the display items to be displayed on the image display unit 104 can be reproduced by the sound reproducing unit 105.

The speech synthesizing unit 122 may set the utterance speed of the speech synthesized, based on the change speed indicated by the change speed signal input from the display processing unit 121. For example, the speech synthesizing unit 122 may set the utterance speed such that the utterance speed increases with an increase of the change speed.

The processing control unit 123 controls processing in each configuration of the input apparatus 10. Moreover, the processing control unit 123 controls the mode of processing (processing mode) in each configuration of the input apparatus 10, based on the contact operation signal input from the operation detecting unit 111 and the running condition signal input from the running condition determining unit 113.

For example, the processing control unit 123 determines whether the running condition signal indicates that the vehicle is moving, and whether the contact speed indicated by the contact operation signal is higher than the preset threshold of contact speed, or the contact acceleration indicated by the contact operation signal is higher than the preset threshold of contact acceleration.

The processing control unit 123 may perform any one of or both of a determination of whether the contact speed is higher than the preset threshold of contact speed, and a determination of whether the contact acceleration indicated by the contact operation signal is higher than the preset threshold of contact acceleration.

When having determined that the vehicle is moving, and the contact speed is higher than the preset threshold of contact speed or the contact acceleration is higher than the preset threshold of contact acceleration, the processing control unit 123 determines to perform the processing in the continuous change mode.

The continuous change mode is a processing mode of continuously changing the display items according to the flick operation, and is also referred to as roulette mode. However, when a predetermined input is detected in the continuous change mode, change of the display items is stopped. The predetermined input includes, for example, the contact operation signal to be used at the time of selecting the display item by the item selecting unit 114, the recognition item data, and the synthesis control signal for controlling the processing performed by the speech synthesizing unit 122. In other cases, the processing control unit 123 determines to perform the processing in the normal mode. In the normal mode, it is different from the continuous change mode in that change of the display items temporarily performed according to the flick operation is stopped. The processing control unit 123 outputs a processing mode signal indicating the determined processing mode (for example, the continuous change mode) to the speech recognizing unit 112 and the item selecting unit 114.

An example of the display item to be displayed on the image display unit 104 will be described next.

Figure 3:
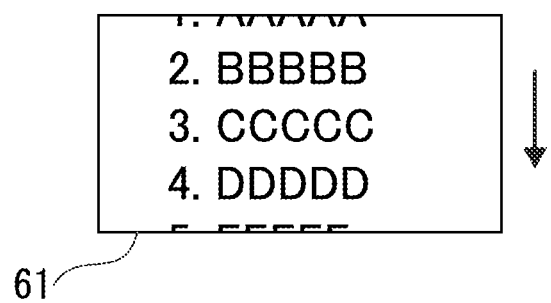
FIG. 3 is a diagram showing an example of display items to be displayed on an image display unit.

FIG. 3 shows an example of the display item to be displayed on the image display unit 104.

In the example shown in FIG. 3, item images indicating three display items of "2. BBBBB" "3. CCCCC" and "4. DDDDD" are displayed in an input frame 61 in the image display unit included in the MID device 51. A downward arrow displayed on the right side of the three display items indicates that the displayed item images are moving corresponding to the contact position being displaced downward, while the user operates the operating object with the touch sensor 11.

An example of the change speed set by the display processing unit 121 will be described next.

Figure 4:
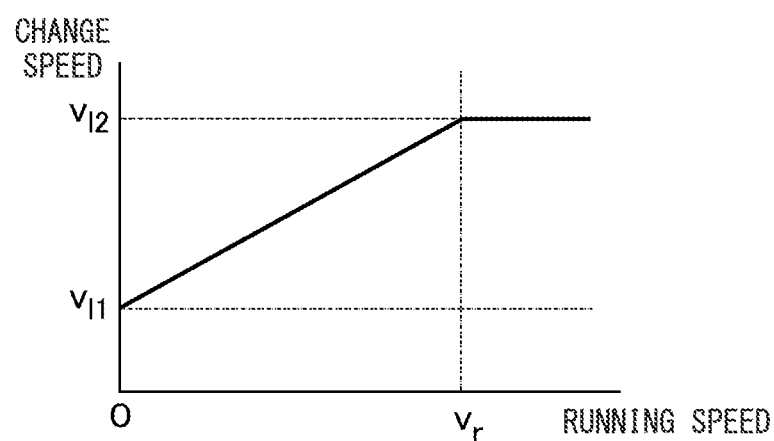
FIG. 4 is a diagram showing an example of change speed set by a display processing unit according to the present embodiment.

FIG. 4 shows an example of the change speed set by the display processing unit 121 according to the present embodiment.

In FIG. 4, the Y axis and the X axis respectively denote the change speed and the running speed. In the example shown in FIG. 4, as the running speed increases from 0 (km/h) to a preset threshold $v_r$ of running speed, the change speed increases substantially linearly from a lower limit $V_{11}$ (for example, 0.4 lines per second) to an upper limit $V_{12}$ (for example, 1 line per second). In this example, even if the running speed exceeds the preset threshold $v_r$ of running speed, the change speed does not change and stays at the upper limit $V_{12}$.

An example of utterance speed set by the speech synthesizing unit 122 will be described next.

Figure 5:
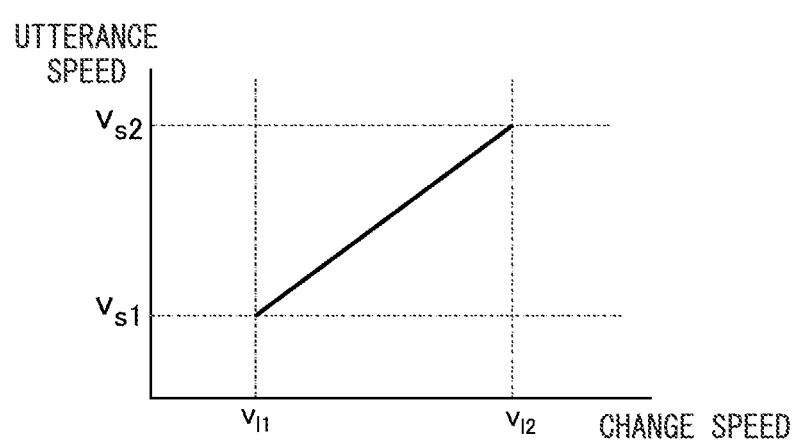
FIG. 5 is a diagram showing an example of utterance speed set by a speech synthesizing unit according to the present embodiment.

FIG. 5 shows an example of utterance speed set by the speech synthesizing unit 122 according to the present embodiment.

In FIG. 5, the Y axis and the X axis respectively denote the utterance speed and the change speed. In the example shown in FIG. 5, as the change speed increases from the lower limit $V_{11}$ to the upper limit $V_{12}$, the utterance speed increases substantially linearly from a lower limit $V_{s1}$ (for example, 400 moras per minute) to an upper limit $V_{s2}$ (for example, 800 moras per minute). The range of the utterance speed is faster than the standard utterance speed of Japanese (about 400 moras per minute), and corresponds to the upper limit range (about 800 moras per minute) of the utterance speed with which there is no problem in understanding of the utterance content. That is, this range is a range of the utterance speed faster than the standard utterance speed. The mora is a unit of pronunciation corresponding to one kana character of Japanese.

In this example, in response to the change speed being limited to within the preset range (lower limit $V_{11}$ to upper limit $V_{l2}$), the utterance speed is limited to the preset range (lower limit $V_{s1}$ to upper limit $V_{s2}$).

Another display example of the item image in the image display unit 104 will be described next.

Figure 6:
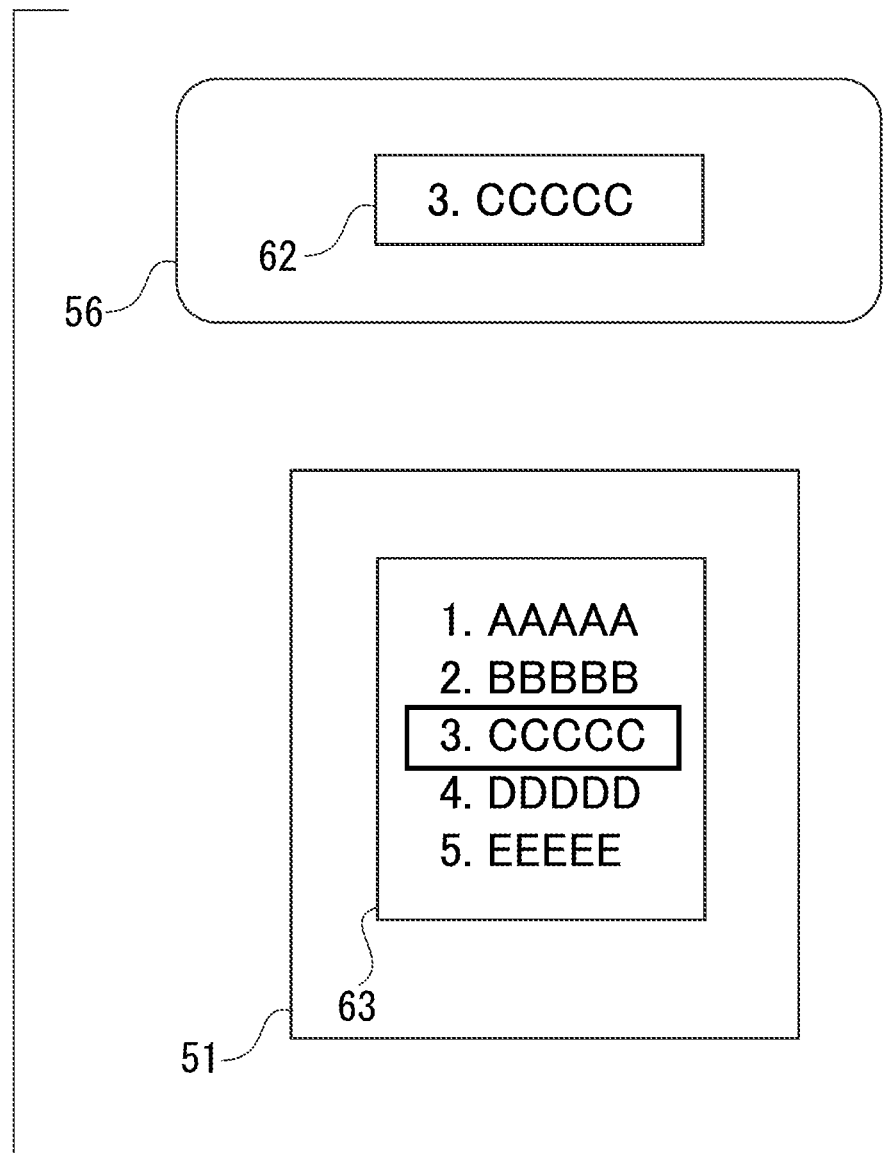
FIG. 6 is a diagram showing another display example of an item image in the image display unit according to the present embodiment.

FIG. 6 shows another display example of the item image in the image display unit 104 according to the present embodiment.

In the example shown in FIG. 6, the HUD device 52 (FIG. 1) displays the item image in an area surrounded by a display frame 62 on the front glass 56 (FIG. 1) upward and in front of the driver's seat, and the MID device 51 (FIG. 1) displays the item image in an area surrounded by a display frame 63 on the image display unit. The display panes 62 and 63 have different shapes and sizes. The display frame 62 has a horizontally long shape, and displays one display item. On the other hand, the display frame 63 has a vertically long shape, and displays five display items. Thus, the display processing unit 121 can display the display items in different numbers and arrangement on an image display means constituting the image display unit 104 (FIG. 2).

The display item selected by the item selecting unit 114 will be described next.

Figure 7:
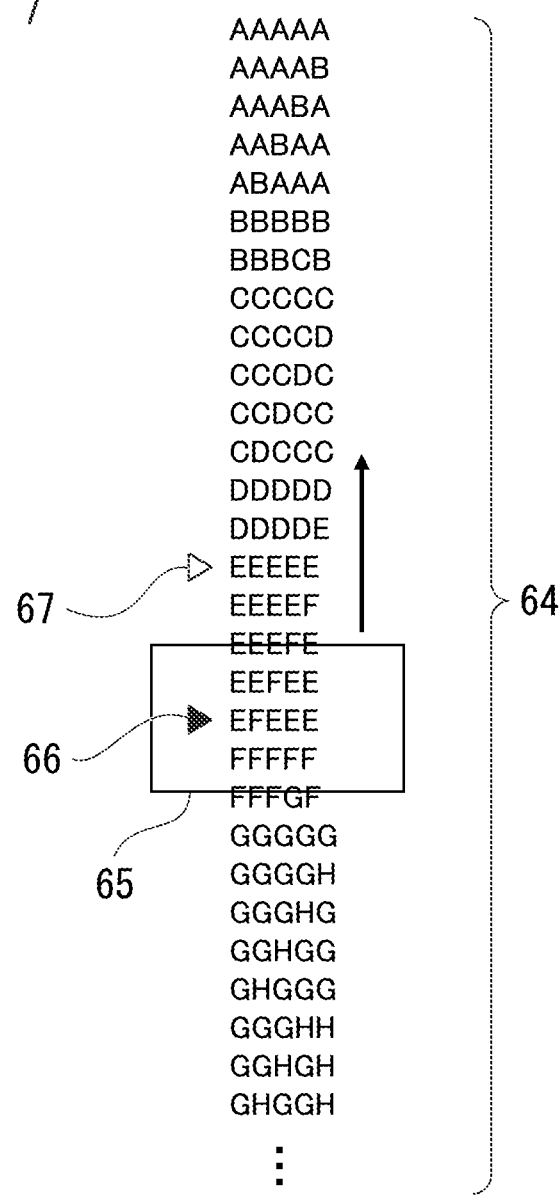
FIG. 7 is a diagram showing an example of display items selected by an item selecting unit according to the present embodiment.

FIG. 7 shows an example of the display items selected by the item selecting unit 114 according to the present embodiment.

In FIG. 7, a plurality of items arranged from top down indicates an item arrangement image 64. The horizontally long rectangular shape shown slightly on the lower side from the center indicates a display frame 65. In the item arrangement image 64, a part included in a region of the display frame 65 is displayed as the item images on the image display unit 104, and a part not included in the region is not displayed. The rightward black triangle 66 indicated substantially in the vertically middle of the display frame 65 indicates that an item "EFEEE" on the right of the black triangle is an item in which the position corresponding to the contact position is currently included in the display area of "EFEEE". When movement of the contact position is not compensated, this item is selected. The upward arrow having a point of origin on the upper right side of the display frame indicates that the item arrangement image 64 moves upward with an upward movement of the contact position.

The white triangle 67 indicated on the upper left side of the display frame 65 indicates that an item "EEEEE" on the right of the white triangle is an item in which the position corresponding to the contact position is included in the display area of "EEEEE" at a time going back to the past by the standby time from the present. As a result, the influence of the movement of the display item due to the response time and the processing time is compensated, and the user can select a desired item or an item closer to the desired item.

Every time the user performs a predetermined operation input (for example, the click operation) with respect to the operation input unit 101, the display processing unit 121 can move the item arrangement image 64 upward or downward one item at a time. Even if the selected item "EEEEE" is not the item desired by the user, the user can easily select the desired item by performing the predetermined operation input.

Input processing according to the present embodiment will be described next.

Figure 8:
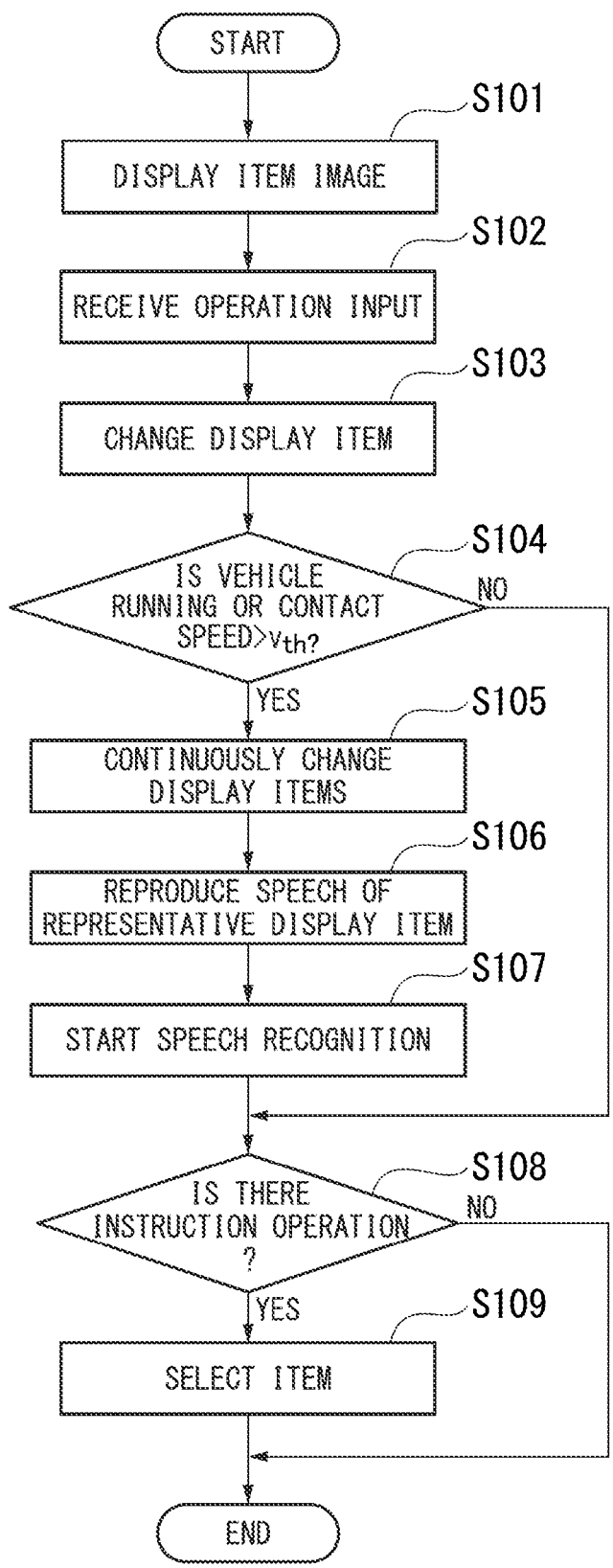
FIG. 8 is a flowchart showing an input process according to the present embodiment.

FIG. 8 is a flowchart of the input processing according to the present embodiment.

(Step S101) The display processing unit 121 reads the item data and generates the item arrangement image in which the items indicated by the read item data are arranged, and extracts an item image signal indicating the item images included in the predetermined display frame, from the generated item arrangement image. The display processing unit 121 outputs the extracted item image signal to the image display unit 104 and displays the item images. Subsequently, control proceeds to Step S102.

(Step S102) The operation input unit 101 receives the operation input from the user, and detects the contact signal indicating the contact area where the operating object has touched. The operation detecting unit 111 calculates the contact position, the moving direction of the contact position, the contact speed, the contact acceleration, the moving amount, and the like based on the contact signal input from the operation input unit 101. The operation detecting unit 111 determines the type of the operation based on the calculated contact position, the moving direction of the contact position, the moving amount, and the like. Control then proceeds to Step S103.

(Step S103) The display processing unit 121 changes the display item by moving the item image according to the type of the operation, movement of the contact position, and the moving direction determined by the operation detecting unit 111. Subsequently, control proceeds to Step S104.

(Step S104) The processing control unit 123 determines whether the running condition signal input from the running condition determining unit 113 indicates the running condition (moving), and the contact speed is higher than a preset threshold $V_{th}$ of contact speed. When determining that the running condition signal indicates the running condition, and the contact speed is higher than the preset threshold $V_{th}$ of contact speed (Step S104, YES), the processing control unit 123 determines that the operation mode is the continuous change mode, and proceeds to Step S105. When determining that the running condition signal does not indicate the running condition, or the contact speed is equal to or lower than the preset threshold $V_{th}$ of contact speed (Step S104, NO), the processing control unit 123 determines that the operation mode is the normal mode, and proceeds to Step S108.

(Step S105) When the operation detecting unit 111 detects the flick operation, the display processing unit 121 continuously moves the position of the item arrangement image, to continuously change the display items. Control then proceeds to Step S106.

(Step S106) The speech synthesizing unit 122 synthesizes any of the display items displayed by the display processing unit 121, for example, a sound signal of the speech indicating the representative display item. The speech synthesizing unit 122 outputs the synthesized sound signal to the sound reproducing unit 105 to reproduce the speech indicating the representative display item. Subsequently, control proceeds to Step S107.

(Step S107) The speech recognizing unit 112 starts the speech recognition to recognize any of the items indicated by the item data as the utterance content of the speech indicated by the sound signal input from the sound collecting unit 102. The speech recognizing unit 112 outputs the recognition item data indicating the recognized item, to the item selecting unit 114. Subsequently, control proceeds to Step S108.

(Step S108) The item selecting unit 114 determines whether the contact operation signal indicating an instruction operation (for example, double-click operation) to instruct the predetermined display item (for example, representative display item) is input from the operation detecting unit 111. When the item selecting unit 114 determines that the contact operation signal is input (Step S108, YES), control proceeds to Step S109. When the item selecting unit 114 determines that the contact operation signal is not input (Step S108, NO), the processing shown in the flowchart is finished.

The item selecting unit 114 may determine whether the recognition item data is input from the speech recognizing unit 112 instead of or in addition to the processing of determining whether the contact operation signal indicating the instruction operation is input. When the item selecting unit 114 determines that the recognition item data is input (Step S108, YES), control proceeds to Step S109. When the item selecting unit 114 determines that the recognition item data is not input (Step S108, NO), the processing shown in the flowchart is finished.

(Step S109) The item selecting unit 114 selects the item in which the position on the image display unit 104 corresponding to the contact position indicated by the contact operation signal is included in the displayed area. Moreover, the item selecting unit 114 selects the item indicated by the recognition item data. The selected item is used in the control or processing by the predetermined device or component. Subsequently, the processing shown in the flowchart is finished.

In the processing shown in the flowchart, in Step S104, the processing control unit 123 may determine whether the running condition signal input from the running condition determining unit 113 indicates the running condition and the contact acceleration is higher than a preset threshold $a_{th}$ of contact acceleration. When determining that the running condition signal indicates the running condition and the contact acceleration is higher than the preset threshold $a_{th}$ of contact acceleration, the processing control unit 123 determines that the operation mode is the continuous change mode, and proceeds to Step S105. When determining that the running condition signal does not indicate the running condition or the contact acceleration is equal to or lower than the preset threshold $a_{th}$ of contact acceleration, the processing control unit 123 determines that the operation mode is the normal mode, and proceeds to Step S108.

As described above, in the present embodiment, the operation position corresponding to the operation input is detected, and the item to be displayed on the display unit of the plurality of items is changed according to a change of the detected operation position. Moreover, in the present embodiment, when the vehicle is moving, and the operation speed at which the operation position moves is higher than the preset threshold of operation speed, or the operation acceleration at which the operation speed changes is higher than the preset threshold of operation acceleration, the processing of changing the item to be displayed is continued until there is a predetermined input.

Consequently, because the state in which the item to be displayed on the display unit is sequentially changed continues when the operation speed is increased during moving, a situation where the user keeps a close watch on the item displayed on the display unit can be prevented. As a result, the user can select the item easily.

Second Embodiment

A second embodiment according to the present invention will be described next. Configurations similar to those in the embodiment described above are denoted by the same reference symbols.

Figure 9:
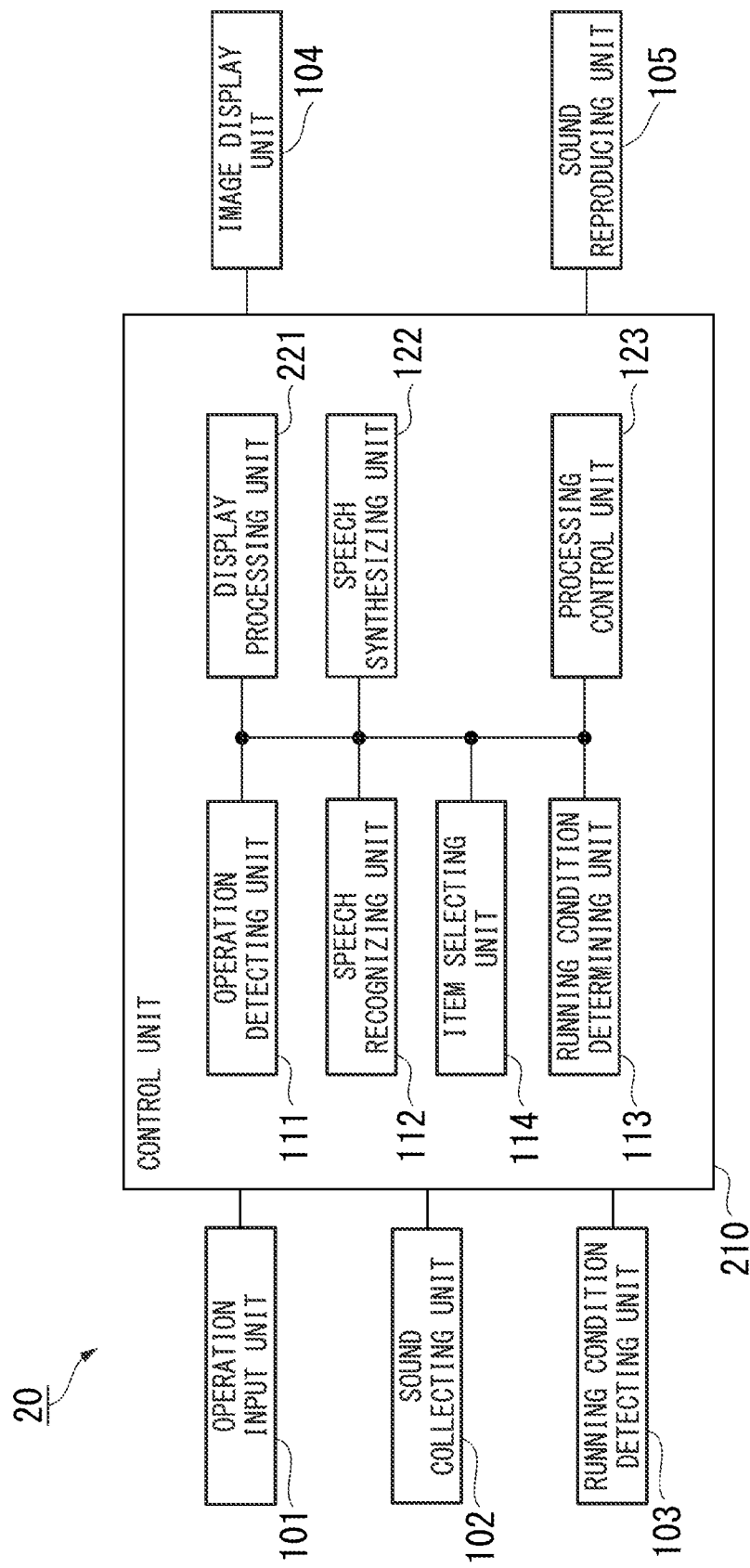
FIG. 9 is a schematic block diagram showing a configuration of an input apparatus according to a second embodiment of the present invention.

FIG. 9 is a schematic block diagram showing the configuration of an input apparatus 20 according to the present embodiment.

The input apparatus 20 includes a control unit 210 instead of the control unit 110 (FIG. 2) in the input apparatus 10 (FIG. 2). The control unit 210 includes a display processing unit 221 instead of the display processing unit 121 (FIG. 2) in the control unit 110 (FIG. 2).

The display processing unit 221 causes an image display unit 104 to display a preset number of display items, of a plurality of items indicated by item data as in the display processing unit 121 (FIG. 2). The display processing unit 221 performs the next processing when each of respective items indicated by the item data is classified into one or a plurality of large items.

When the set change speed is higher than a preset threshold of change speed, the display processing unit 221 causes the image display unit 104 to display a large item corresponding to a display item, instead of the display item.

The large item is a character indicating classification or attribution common to one or the plurality of items or the conception thereof. For example, the large item can be an initial letter of the respective items. When a certain item is "Alfred", a character of alphabet "A", which is an initial letter thereof, is the corresponding large item. When the respective items are song titles, the corresponding large items can be the names of singers, the names of players, or the names of composers. Moreover, when the respective items are destinations, the corresponding large item can be local names such as countries, prefectures, provinces, and municipalities.

The preset threshold of change speed may be lower than the change speed corresponding to a threshold of contact speed at which a processing control unit 123 determines whether the processing is performed in a continuous change mode, or may be the same as the change speed. When the preset threshold of change speed is equal to the change speed corresponding to the threshold of contact speed, the large item corresponding to the display item is displayed on the image display unit 104 at the time of performing the processing in the continuous change mode.

Moreover, the display processing unit 221 may cause the image display unit 104 to display the large item for a preset certain display time, that is, a display time common to the large items, regardless of the number of items associated with one large item. The certain display time may be set, for example, equal to or longer than a minimum operation time (for example, 1 second), which is a sum of a response time after the user visually checks the item displayed on the image display unit 104 until the operating object touches an operation input unit 101 (for example, 0.7 seconds), and a processing time consumed for processing to select any of the display items since contact of the operating object with the operation input unit 101 (for example, 0.3 seconds). As a result, a desired item related to the large item can be easily selected by using the large item as a clue until the time required for the response and processing by the user has passed.

For example, a case in which the item data has items "Able", "Alpha", and "Alfred" classified as the large item by a character "A", and items "Benjamin" and "Bravo" classified as the large item by a character "B" is considered. In this case, the number of items to be classified by characters "A" and "B" are respectively three items and two items. In such a case, characters "A" and "B" are displayed on the image display unit 104 respectively for the certain display time.

Moreover, the display processing unit 221 may store the large items corresponding to the respective items indicated by the read item data in association with a phoneme sequence indicating the pronunciation thereof, in a word dictionary of a speech recognizing unit 112. Furthermore, likelihood related to the large item and likelihood related to the items corresponding to the large item may be stored in the word dictionary, in association with the large item and the items. Meanwhile, the speech recognizing unit 112 preferentially selects a word having a high likelihood as a recognition result. Consequently, the large item is selected prior to the corresponding item.

In the present embodiment, the item selecting unit 114 may select the first display item of the display items classified by the large item corresponding to the display item having a display area including a position corresponding to the currently detected contact position. In the example shown in FIG. 7, when the contact position included in the display area of the item "EEEEE" on the right side of the triangle 66 is detected, "EEEEE" which is the first display item of the display items classified into a large item "E" corresponding to the item, is selected.

Furthermore for example, the item selecting unit 114 may change a candidate item to an item adjacent to a preset arrangement direction, every time a contact operation signal indicating the click operation is input as a predetermined operation input. Moreover when the contact operation signal indicating the double-click operation is input as an operation input in a different mode, the item selecting unit 114 may decide the currently set candidate item as the selected item.

As a result, the user can sequentially select any of the display items classified by the large item displayed on the image display unit 104, by using the first display item as a point of origin.

Moreover, the item selecting unit 114 may adopt the display item having the display area including a position corresponding to a contact position detected at a time going back to the past by the standby time from the present. The item selecting unit 114 selects the first display item of the display items classified by the large item corresponding to the adopted display item. As a result, the influence of the movement of the display items due to the passage of the response time and the processing time is compensated.

An example of the large item to be displayed on the image display unit 104 according to the present embodiment will be described next.

Figure 10:
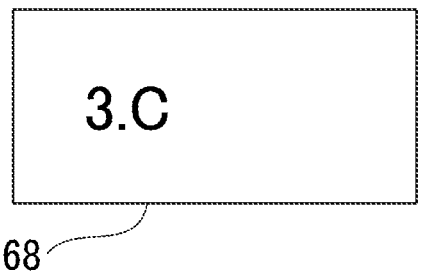
FIG. 10 is a diagram showing an example of a large item to be displayed on an image display unit according to the present embodiment.

FIG. 10 shows an example of the large item to be displayed on the image display unit 104 according to the present embodiment.

In the example shown in FIG. 10, a character string "3. C" is displayed in an area of a display frame 68 in the image display unit 104. The character string includes a number "3." indicating an order of display item "3. CCCCC", and an initial letter "C". Accordingly, in the present embodiment, the character string including the initial letter "C" corresponding to the display item as the large item is displayed instead of the display item "3. CCCCC". In this example, display of the number "3." indicating the order may be omitted.

In this manner, because the respective large items are displayed in each certain display time, the frequency of changing the display contents decreases more than in the case of displaying the respective display items sequentially. Consequently, a situation where the user keeps a close watch on the image display unit 104 can be prevented, and a clue to select the display item having "C" as the large item is provided to the user. As a result, the user can select a desired item easily.

As described above, in the present embodiment, a plurality of items is respectively classified into one or a plurality of large items, and the display unit is caused to display the large item corresponding to the display item instead of the display item, when the change speed exceeds the preset threshold of change speed. Consequently, the frequency of changing the display contents decreases. Consequently, a situation where the user keeps a close watch on the image display unit 104 can be prevented, and a clue to select the display item classified into the large item is provided to the user. As a result, the user can select the item easily.

In the embodiments described above, when the processing mode indicated by the processing mode signal input from the processing control unit 123 is the continuous change mode, the display processing unit 121, 221 may cause the image display unit 104 to display a continuous change mode image indicating that the current processing mode is the continuous change mode. Therefore, the display processing unit 121, 221 stores a continuous change mode image signal indicating the continuous change mode image beforehand, and read the continuous change mode image signal when the processing mode signal indicating that the processing mode is the continuous change mode is input. The display processing unit 121, 221 superimposes the continuous change mode image indicated by the read continuous change mode image signal on the display item image (this may be an image indicating the large item corresponding to the display item). The display processing unit 121, 221 outputs an image signal indicating the image in which the continuous change mode image is superimposed on the display item image, to the image display unit 104.

Figure 11:
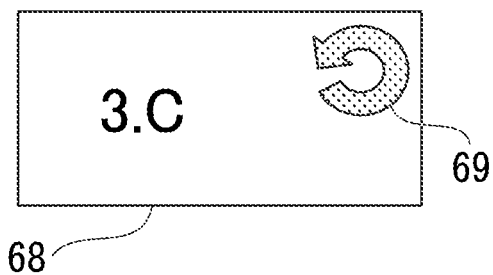
FIG. 11 is a diagram showing an example of a display item image superimposed with a continuous change mode image.

FIG. 11 shows an example of the display item image on which the continuous change mode image is superimposed.

In FIG. 11, an image, in which a continuous change mode image 69 is superimposed on a display item image indicating number "3." and the large item "C" shown in FIG. 10, is displayed in the display frame 68. As a result, the user who visually checks the image display unit 104 can easily ascertain that the input apparatus 10, 20 is operating in the continuous change mode.

In the embodiments described above, the item data may be data indicating an item including a plurality of hierarchies. That is, there may be a correspondence relation with an item classified into one hierarchy in any of the items classified into another hierarchy of the plurality of hierarchies. In this case, the item selecting unit 114 may sequentially perform processing of selecting any item of the plurality of items in one hierarchy, and processing of selecting any item in the other hierarchy of the items corresponding to the selected item.

Moreover, a case in which the operation input unit 101 and the image display unit 104 are respectively installed in the vehicle has been described as an example. However, the present embodiment is not limited thereto. In the embodiments described above, one or both of the operation input unit 101 and the image display unit 104 may be constituted as a portable electric device, for example, a multi-function mobile phone (including a so-called smart phone), a tablet terminal device, or a remote control device (remote controller).

A part of the input apparatus 10, 20 according to the above embodiments, for example, the operation detecting unit 111, the speech recognizing unit 112, the item selecting unit 114, the display processing unit 121, 221, the speech synthesizing unit 122, and the processing control unit 123 may be realized by a computer. In this case, a program for realizing the control function is recorded on a computer-readable recording medium, and the program recorded on the recording medium is read and executed by a computer system. The "computer system" referred to herein is incorporated in the input apparatus 10, 20, and includes hardware such as an OS (Operating System) and a peripheral device. The "computer-readable recording medium" is a portable medium such as a flexible disk, a magnetooptical disk, a ROM (Read Only Memory), a CD (Compact Disc)-ROM, or a recording device such as a hard disk incorporated in the computer system. Furthermore, the "computer-readable recording medium" may include one that holds a program dynamically for a short time, such as a communication wire when the program is transmitted via a communication line such as a network like the Internet or a telephone line, and one that holds the program for a certain time such as a volatile memory inside the computer system, which becomes a server or a client in that case. Moreover, the program described above may be one that realizes a part of the functions described above, and may realize the functions in combination with a program already recorded in the computer system.

Furthermore, a part of or the entire input apparatus 10, 20 in the embodiments described above may be realized as an integrated circuit such as an LSI (Large Scale Integration). Respective functional blocks of the input apparatus 10, 20 may form a processor individually, or a part of or the entire input apparatus may be integrated and formed as a processor. Moreover, the method of forming the integrated circuit is not limited to an LSI, and may be realized by a dedicated circuit or a general-purpose processor. Furthermore, when a technique of forming the integrated circuit as a substitute of the LSI appears due to advancements in the semiconductor technology, the integrated circuit based on the technique may be used.

The embodiments of the present invention have been described in detail with reference to the drawings. However, the specific configurations are not limited thereto, and various design changes can be performed without departing from the scope of the present invention.

What is claimed is:

1. An input apparatus comprising:
    an operation input unit that detects an operation position corresponding to an operation input;
    a display processing unit that changes a display item to be displayed on a display unit of a plurality of items, depending on a change of the operation position;
    a processing control unit that continues a process of changing the display item to be displayed on the display unit until a predetermined input is received, while a vehicle is moving, and when an operation speed of moving the operation position is higher than a preset threshold of the operation speed, or an operation acceleration at which the operation speed changes is higher than a preset threshold of the operation acceleration;
    an item selecting unit that selects any of the plurality of items based on the predetermined input; and
    a speech recognizing unit that recognizes an utterance content by a user,
    wherein the processing control unit causes the speech recognizing unit to start a process of recognizing at least any of the display items from the utterance content by the user, when the operation speed is higher than the threshold of the operation speed, or when the operation acceleration is higher than the threshold of the operation acceleration.

2. The input apparatus according to claim 1, wherein the processing control unit sets a higher change speed for changing the display items as a running speed of the vehicle increases.

3. The input apparatus according to claim 1, further comprising a speech synthesizing unit that synthesizes speech corresponding to a text indicated by any of the display items, at a rate of utterance corresponding to the change speed for changing the display items.

4. The input apparatus according to claim 1, wherein the plurality of items is classified into one or a plurality of large items, and wherein the processing control unit causes the display unit to display the large item corresponding to the display item, when the change speed for changing the display items exceeds a preset threshold of change speed.

5. The input apparatus according to claim 4, wherein the processing control unit causes the display unit to display each of the large items for a certain predetermined time.

6. The input apparatus according to claim 1, wherein the plurality of items is classified into one or a plurality of large items, and wherein the processing control unit causes the display unit to display the large item corresponding to the display item, when the change speed for changing the display items exceeds a preset threshold of change speed.

7. The input apparatus according to claim 6, wherein, the processing control unit causes the display unit to display each of the large items for a certain predetermined time.

8. The input apparatus according to claim 6, wherein the processing control unit causes the speech recognizing unit to recognize a large item corresponding to any of the display items as the utterance content of recorded speech.

9. The input apparatus according to claim 1, wherein the item selecting unit selects a display item displayed in the past by a predetermined time, from the item selected by the item selecting unit, of the plurality of items.

10. An input method for an input apparatus, the method including:
    a display processing step of changing a display item to be displayed on a display unit of a plurality of items, depending on a change of an operation position detected by an operation input unit corresponding to an operation input;
    a processing control step of continuing a process of changing the display item to be displayed by the display unit until a predetermined input is received, while a vehicle is moving, and when an operation speed of moving the operation position is higher than a preset threshold of the operation speed, or an operation acceleration at which the operation speed changes is higher than a preset threshold of the operation acceleration;
    an item selecting step of selecting any of the plurality of items based on the predetermined input; and
    a speech recognizing step of recognizing an utterance content by a user,
    wherein the processing control step includes starting a process of recognizing at least any of the display items from the utterance content by the user, when the operation speed is higher than the threshold of the operation speed, or when the operation acceleration is higher than the threshold of the operation acceleration.

11. A non-transitory computer-readable storage medium storing an input program that causes a computer of an input apparatus to execute:
    a display processing procedure of changing a display item to be displayed on a display unit of a plurality of items, depending on a change of an operation position detected by an operation input unit corresponding to an operation input;
    a processing control procedure of continuing a process of changing the display item to be displayed by the display unit until a predetermined input is received, while a vehicle is moving, and when an operation speed of moving the operation position is higher than a preset threshold of the operation speed, or an operation acceleration at which the operation speed changes is higher than a preset threshold of the operation acceleration;
    an item selecting procedure of selecting any of the plurality of items based on the predetermined input; and
    a speech recognizing procedure of recognizing an utterance content by a user, wherein the processing control procedure causes the speech recognizing procedure to start a process of recognizing at least any of the display items from the utterance content by the user, when the operation speed is higher than the threshold of the operation speed, or when the operation acceleration is higher than the threshold of the operation acceleration.

* * * * *